United States Patent [19]
Kondo et al.

[11] Patent Number: 5,940,539
[45] Date of Patent: Aug. 17, 1999

[54] MOTION VECTOR DETECTING APPARATUS AND METHOD

[75] Inventors: Tetsujiro Kondo; Yasuhiro Fujimori, both of Kanagawa, Japan

[73] Assignee: Sony Corporation, Tokyo, Japan

[21] Appl. No.: 08/774,916

[22] Filed: Dec. 27, 1996

[30] Foreign Application Priority Data

Feb. 5, 1996 [JP] Japan .................................. 8-042083

[51] Int. Cl.⁶ ...................................................... G06K 9/00
[52] U.S. Cl. ............................................ 382/236; 382/239
[58] Field of Search .................................. 348/699, 416,
348/402, 415, 409, 401, 400, 390, 384,
405, 412, 700, 403, 417, 397, 423, 470,
413, 419; 395/114; 345/202; 382/253, 245,
190, 232, 235, 236, 238, 239, 243

[56] References Cited

U.S. PATENT DOCUMENTS

| | | | |
|---|---|---|---|
| 4,862,267 | 8/1989 | Gillard et al. .......................... | 358/140 |
| 4,890,160 | 12/1989 | Thomas ................................... | 358/105 |
| 5,040,062 | 8/1991 | Knauer et al. ........................... | 358/141 |
| 5,083,206 | 1/1992 | Knauer et al. ........................... | 358/141 |
| 5,198,901 | 3/1993 | Lynch ...................................... | 358/136 |
| 5,276,513 | 1/1994 | van der Wal et al. .................. | 358/136 |
| 5,367,629 | 11/1994 | Chu et al. ................................ | 395/162 |
| 5,485,224 | 1/1996 | Burns et al. ............................. | 348/699 |
| 5,488,419 | 1/1996 | Hui et al. ................................. | 348/699 |
| 5,489,949 | 2/1996 | Jeong et al. ............................. | 348/699 |

*Primary Examiner*—Leo H. Boudreau
*Assistant Examiner*—Bijan Tadayon
*Attorney, Agent, or Firm*—Frommer Lawrence & Haug, LLP.; William S. Frommer; Dennis M. Smid

[57] ABSTRACT

A motion vector detecting apparatus for detecting a motion vector at a below-pixel precision of an input image is constructed by a predicting unit for predicting a pixel value at a position which is more detailed than a pixel position by using a class sort adaptive process to a target image signal; and a motion vector detecting unit for detecting the motion vector for the image signal including the predicted pixel value.

54 Claims, 11 Drawing Sheets

Fig. 2 (RELATED ART)
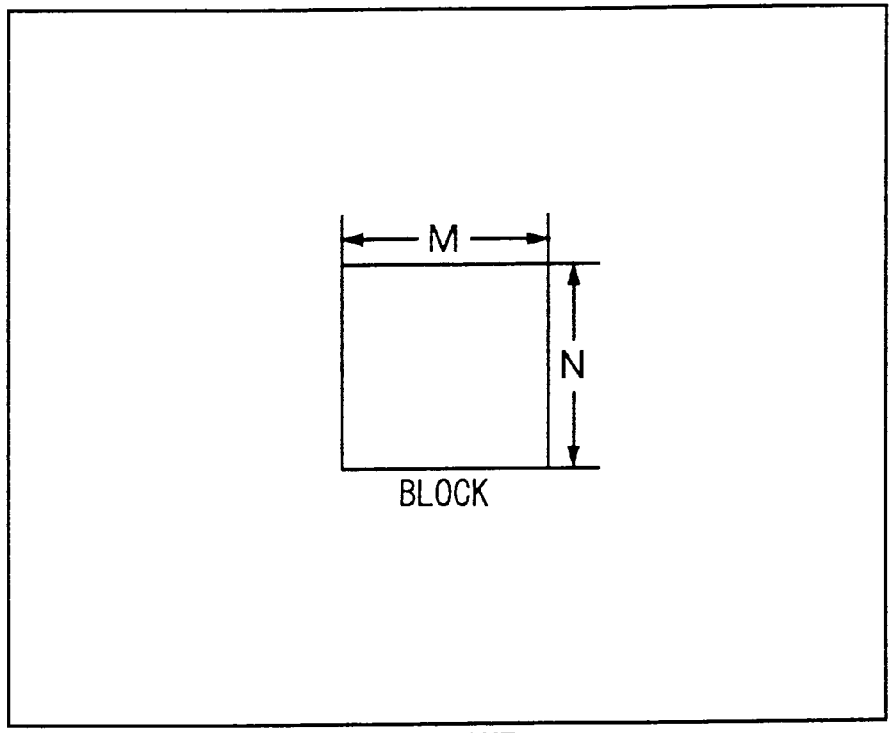
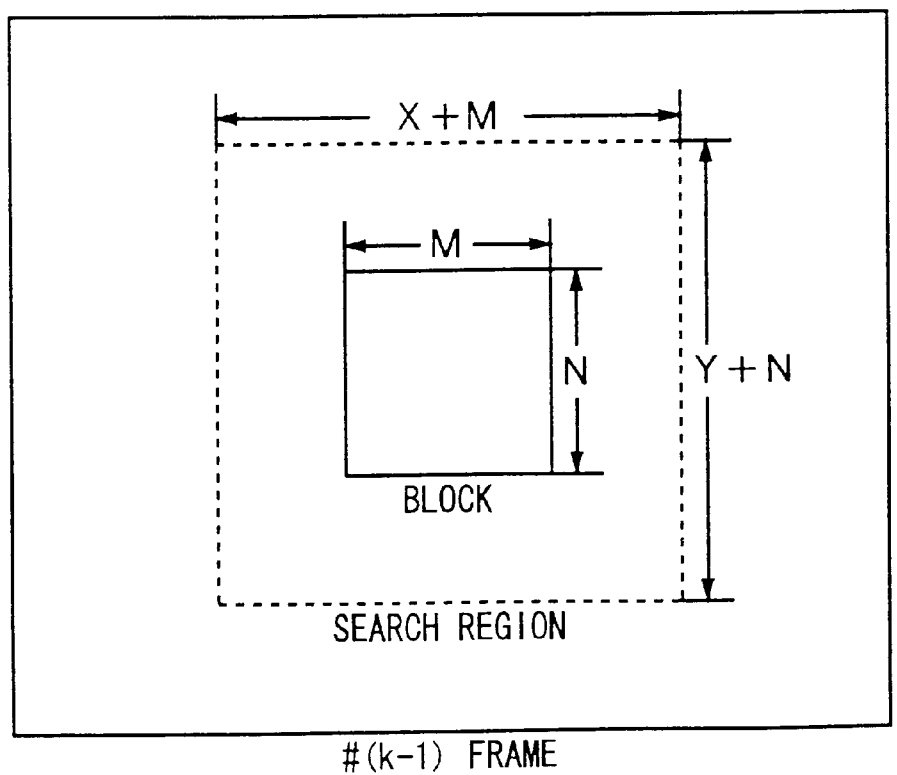

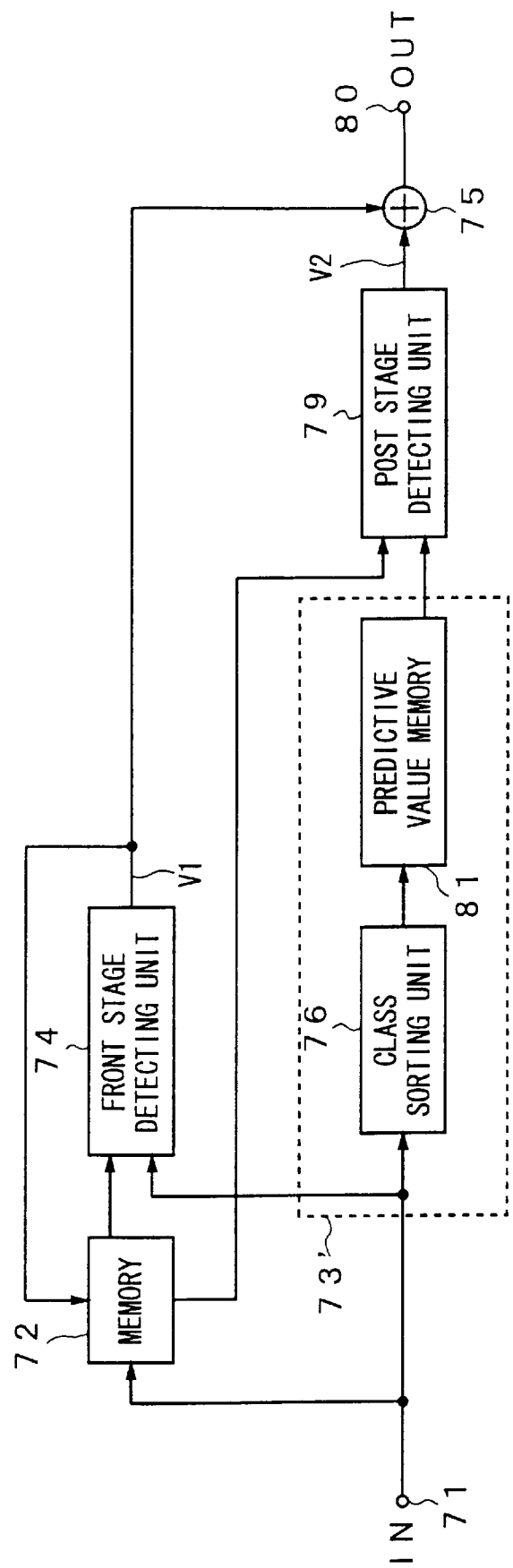

MOTION VECTOR DETECTING APPARATUS AND METHOD

BACKGROUND OF THE INVENTION

1. Field of the Invention

The invention relates to motion vector detecting apparatus and method which can detect a motion vector of a below-pixel precision by executing a prediction of a pixel value at a position that is more detailed than a pixel position from an input image signal, a prediction of a motion evaluation value at a below-pixel position from a motion evaluation value at the pixel position, or the like by using a class sort adaptive process.

2. Description of the Related Art

Recently, an importance degree of a motion vector detection for a digital image as a target is more and more increasing. This is because it greatly contributes to a practical use. For example, a motion compensation is generally performed in a recent image compression. The improvement of a precision of the motion vector which is used for the motion compensation results in an improvement in a compression efficiency. Therefore, various methods have been proposed with respect to a motion vector detecting method. Generally, the motion vector detecting method for a motion image as a target is mainly classified into the following three kinds of methods.

The first motion vector detecting method is a block matching method. In the block matching method, a present image and a past image are compared in order to discriminate whether a region of the present image which was divided into blocks existed in the past image by the same idea as a pattern matching. As a specific example, a differential absolute value of every corresponding pixel in the block is added and a position where a differential absolute value sum of every block is minimum is set to the motion vector. According to the above method, although a detecting precision is high, there is a drawback such that an operation amount is extremely large.

The second motion vector detecting method is a gradient method. The gradient method is based on a model such that when a pixel having a certain space inclination moves to a certain position, a time difference according to a motion amount occurs. Therefore, by dividing the time difference by the space inclination, a motion vector is obtained. This method is excellent in a point such that an operation amount is small. However, there is a drawback such that when the motion amount increases, a precision deteriorates. This is because the above model is not satisfied.

The third motion vector detecting method is a phase correlation method. The phase correlation method is a method whereby a Fourier transformation is performed to block data at the same position of the present image and the past image, a deviation amount of the phase is detected in a frequency region, and an inverse Fourier transformation is subsequently executed, thereby detecting the motion vector from information of a phase term thereof. As characteristics of the method, in order to assure a precision, a large block size of a certain extent or more is required. Therefore, an operation amount by the Fourier transformation is remarkably large. Moreover, there is a drawback such that a possibility in which a plurality of motion objects exist in a large block is generally high, so that the discrimination is difficult. Since the precision of the motion vector is a target pixel precision of the Fourier transformation, only the motion vector of an input pixel pitch can be obtained.

A constructional example in which a motion vector of a pixel precision is detected by using the phase correlation method will now be described with reference to FIG. 1. An image signal d11 is supplied from an input terminal 11. The image signal d11 is supplied to a block dividing unit 12. The supplied image signal d11 is divided into predetermined blocks by the block dividing unit 12. An image signal d12 which was divided into blocks is supplied from the block dividing unit 12 to a Fourier transforming unit 13 and a frame memory 15. In the Fourier transforming unit 13, a Fourier transformation is executed to the supplied image signal d12. In the frame memory 15, the supplied image signal d12 is delayed by one frame and, after that, is supplied to a Fourier transforming unit 16 as an image signal d16.

In the Fourier transforming unit 16, a Fourier transformation is executed to the one-frame preceding block data processed by the Fourier transforming unit 13. Operation results d13 and d17 of the Fourier transforming units 13 and 16 are supplied to a phase correlation detecting unit 14. The phase correlation detecting unit 14 forms a phase correlation (phase difference matrix) $\exp(-j\phi)$ which will be described hereinlater in accordance with the two operation results d13 and d17 which are supplied. The formed phase correlation $\exp(-j\phi)$ is supplied to a vector detecting unit 17. In the vector detecting unit 17, an inverse Fourier transformation and a peak detection of a phase correlation function are executed to the phase correlation $\exp(-j\phi)$ and a motion vector d15 can finally be obtained. The motion vector d15 is outputted from an output terminal 18.

However, a precision of the motion vector which is detected by using the phase correlation is set to one pixel unit. In case of the motion compensation, for example, in order to execute a compensation at a high precision, it is necessary to detect a motion vector of a precision higher than one pixel.

A prior art of a motion vector detecting apparatus of a below-pixel precision will now be shown.

According to the above motion vector detecting apparatus, a motion vector of the pixel precision is detected by using the block matching method and, on the basis of a motion evaluation value which is formed at that time, a motion vector of a below-pixel precision is detected. First, for an explanation of the block matching method, a constructional example of the block data is shown in FIG. 2. A case where a motion vector of a certain block is detected in an adjacent frame is considered. In a #k frame and a #(k−1) frame, a block of a size of (M pixels×N lines) is set to a spatially corresponding position.

A pattern matching is performed between the block of the #k frame and the block at each coordinate of the #(k−1) frame, thereby detecting optimum coordinates. A differential absolute value sum or the like of the corresponding pixel in the block of a size of (M pixels×N lines) corresponding to each position is used for evaluation. Assuming that each pixel level of the #k frame is set to $L_n(i, j)$ and each pixel level of the #(k−1) frame is set to $L_{n-1}(i, j)$, the following equation (1) or the like can be mentioned as an example of an evaluating equation at coordinates (x, y).

Evaluating equation:

$$E(x, y) = \sum_{i=0}^{M-1} \sum_{j=0}^{n-1} |L_n(i, j) - L_n(i+x, j+y)| \qquad (1)$$

In an example of FIG. 2, a value of a motion evaluation value E of the equation (1) is calculated at each coordinate of an X·Y point. In the coordinates of the X·Y point, coordinates in which the evaluation value indicates the minimum value become a motion vector. Since the evaluation value which is calculated here relates to each pixel, a motion vector which is detected is based on a pixel precision. Subsequently, an example in which a motion vector of a below-pixel precision is detected on the basis of a motion evaluation value at a position near the coordinates of the detected motion vector of the pixel precision is shown.

For explanation, an example in which the motion evaluation value of the equation (1) is detected at a 1-dimensional coordinate position is shown in FIG. 3. It is assumed that motion evaluation values of the equation (1) at coordinates X0, X1, and X2 are set to E0, E1, and E2. Since the motion vector of the pixel precision corresponds to coordinates in which the motion evaluation value is minimum, in this case, it is set to X0. As an example in which the motion vector of the below-pixel precision is detected by using the motion evaluation values E0, E1, and E2, it is considered that a fluctuation value ΔX below the pixel is obtained by a linear interpolation on the basis of E0, E1, and E2 as shown in the diagram. A calculating equation in this case is expressed by the following equation (2).

Fluctuation value:

$$\Delta X = (E2-E1)/\{2\times(E2-E0)\} \quad (2)$$

Thus, the motion vector of the below-pixel precision in FIG. 3 is set to (X0–Δx). A constructional example of the above process is shown in FIG. 4. Pixel data d21 is supplied from an input terminal 21. The pixel data d21 is supplied to a memory unit 22 and a detecting unit 23. In the memory unit 22, the pixel data d21 is delayed for a predetermined period of time and is supplied as delayed pixel data d22 to the detecting unit 23. In the detecting unit 23, a motion vector of a pixel precision is detected from the pixel data d21 and d22. In case of using the block matching method, the calculation of the motion evaluation value of the equation (1) and the detection of the minimum value are executed and the motion vector of the pixel precision is obtained.

Subsequently, in a detecting unit 24, on the basis of the result obtained from the detecting unit 23, namely, by using the motion vector of the pixel precision as a reference, a motion vector of a below-pixel precision is detected by using the motion evaluation value of the pixel precision. In this case, an arithmetic operation of the equation (2) is executed. The motion vector of the below-pixel precision is finally obtained from an output terminal 25 in this manner.

However, there is actually a problem such that a motion vector having an enough precision cannot be obtained by the linear interpolation mentioned above.

OBJECTS AND SUMMARY OF THE INVENTION

It is, therefore, an object of the invention to provide motion vector detecting apparatus and method in which a pixel value at a position which is more detailed than a pixel position, a motion evaluation value of a below-pixel precision, or the like is predicted by using a class sort adaptive process and a motion vector of a precision higher than one pixel unit can be detected in correspondence to the prediction result.

The invention disclosed in claim 1 will now be simply described.

First, a pixel value at a position that is more detailed than a pixel position is predicted by using a class sort adaptive process, which will be explained hereinlater, for an image signal serving as a target. A motion vector can be detected at a below-pixel precision by detecting the motion vector for an image signal including the predicted pixel value by the class sort adaptive process.

Subsequently, the invention disclosed in claim 8 will now be simply described.

A first motion vector of a pixel position precision is detected for an input image signal. An image which was motion compensated by a first vector is formed. A pixel value at a position that is more detailed than the pixel position is predicted by using a class sort adaptive process for the input image signal. A motion vector of the below-pixel precision is obtained by detecting a motion vector between an image signal including the predicted pixel value and the foregoing compensated input image and is synthesized with the motion vector on a pixel position unit which was obtained before, so that a final motion vector of the below-pixel precision is formed.

In the invention disclosed in claim 13, first, a motion evaluation value is detected from an image signal serving as a target on a pixel position unit basis. A motion evaluation value at the position of the below-pixel precision is predicted by using the class sort adaptive process for the motion evaluation value obtained on the pixel position unit basis and the motion vector of the below-pixel precision can be detected on the basis of the predicted motion evaluation value.

For the class sort adaptive process, there are a predictive coefficient method comprising:

class sorting means for class sorting by using an input pixel value, or a motion evaluation value, or the like;

memory means for storing predictive coefficients which have previously been obtained by learning; and predictive value forming means for forming an optimum predictive value from an arithmetic operation of a predictive equation using the predictive coefficient read out in correspondence to a class and an input pixel value or a motion evaluation value, and a center of gravity method comprising:

class sorting means for executing a class sort by using an input pixel value, a motion evaluation value, or the like;

memory means for storing optimum predictive values which have previously been obtained by learning; and optimum predictive value forming means for forming the optimum predictive value corresponding to the class.

The above and other objects and features of the present invention will become apparent from the following detailed description and the appended claims with reference to the accompanying drawings.

BRIEF DESCRIPTION OF THE DRAWINGS

FIG. 2 is a schematic diagram which is used for explanation of a motion vector detecting apparatus;

FIG. 15 is a block diagram of another embodiment of a motion vector detecting apparatus according to the invention.

DETAILED DESCRIPTION OF THE PREFERRED EMBODIMENTS

Figure 1:
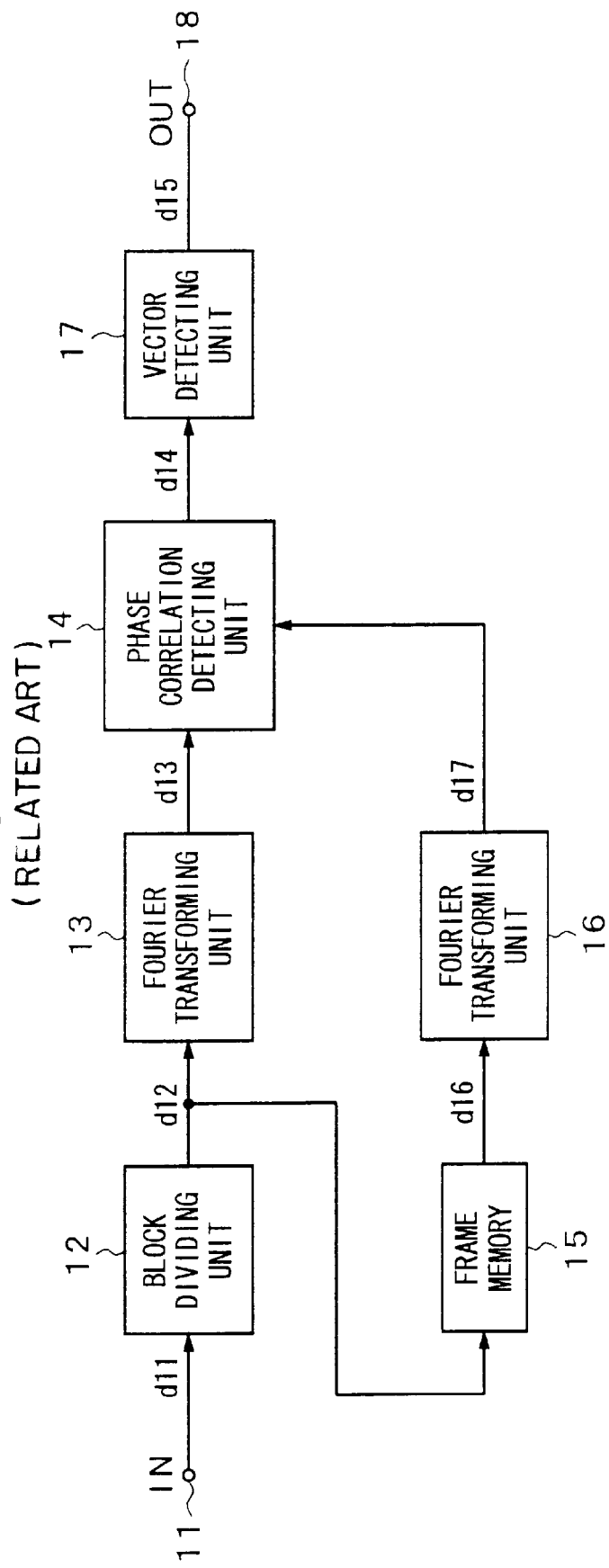
FIG. 1 is a block diagram showing an example of a vector detection of using a phase correlation method.
Figure 3:
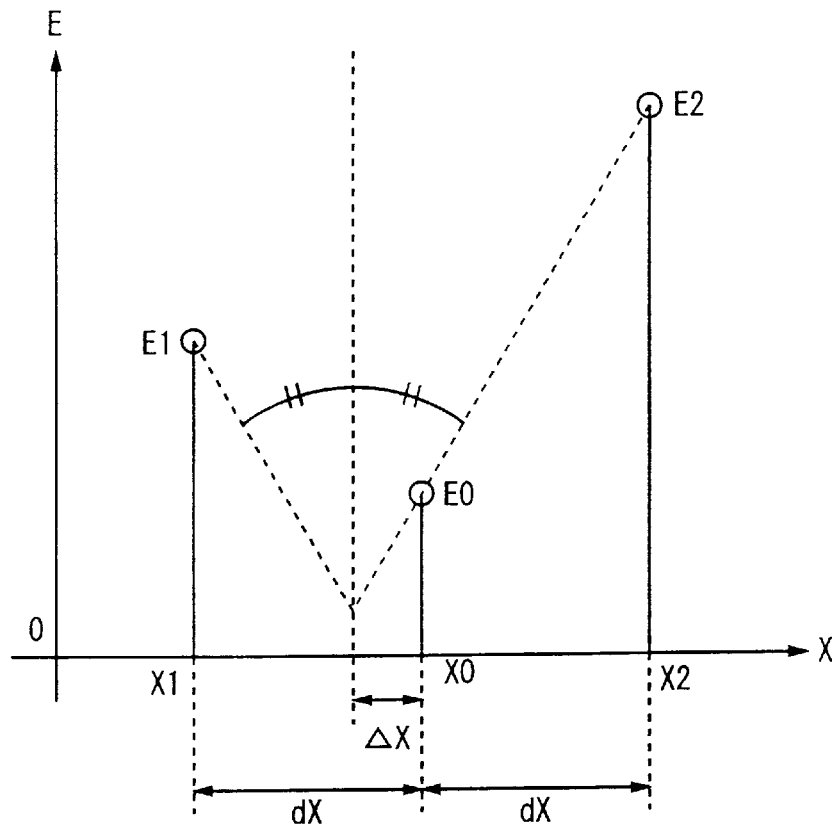
FIG. 3 is a schematic diagram which is used for explanation of a motion evaluation value.

First, a class sort adaptive process will be described as a technique which is common to embodiments which will be explained hereinbelow.

The class sort adaptive process is a method of sorting an input signal into several classes on the basis of a pattern of a level distribution of the input signal and executing a proper adaptive process every prepared class. As an example of the class sorting method, a method of setting class forming taps for an input signal (8-bit PCM data) and forming a class by the pattern of the level distribution of the input signal. As a class forming method of a signal waveform, the following examples and the like have been proposed.

1) A method of directly using PCM (Pulse Code Modulation) data
2) A method of applying an ADRC (Adaptive Dynamic Range Coding)
3) A method of applying a DPCM (Differential PCM)
4) A method of applying a BTC (Block Truncation Coding)
5) A method of applying a VQ (Vector Quantization)
6) A method of applying a DCT (Hadamard transformation).

When the PCM data is directly used, if 8-bit data is used for a class sorting by seven taps, the data is sorted to an enormous number of classes such as 2056 classes. Although the PCM data is ideal in terms of a meaning of grasping the pattern of the level distribution, a burden on a circuit is large, so that there is a problem on a practical use. Therefore, the number of classes is reduced by actually applying the ADRC or the like. Although the ADRC is a method developed as a signal compression technique, it is suitable for a class expression. The ADRC is fundamentally a requantizing process and is shown by the following equation (3). On the basis of a local dynamic range (maximum value -minimum value) which is defined by several taps near target data, the data of those several taps is requantized by a width of a quantization step which is defined as a k-bit requantization.

$$ci = (Xi - MIN)/(DR/2^k) \quad (3)$$

where, $ci$: ADRC code
$Xi$: input pixel
MIN: minimum value in a near region
DR: dynamic range in the near region
k: the number of requantization bits A class sort is executed for a few taps near the target data by the ADRC code which is formed by using the ADRC that is defined by the equation (3). For example, when the 1-bit ADRC is applied to the 9-tap data, after the minimum value in the nine data was eliminated from each data, the data of each tap is adaptively subjected to a quantization of one bit on the basis of the dynamic range that is defined from the nine data, so that it can be reduced to 512 classes. Classes are expressed by using frequency regions such as general DPCM, BTC, VQ, DCT, or the like as another compressing technique.

To further improve the performance of the class sort, there is a case where the class sort is performed in consideration of an activity of the input signal as well. When the ADRC is used for the class sorting method, a dynamic range is often used for a discriminating method of the activity. When the DPCM is used for the class sorting method, the differential absolute value sum is used. When the BTC is used for the class sorting method, the absolute value or the like of the standard deviation is used as a discriminating method of the activity.

The class sort or the like using the foregoing ADRC is executed every sort result by the activity. In the learning step, the data of a small activity is excluded from the learning targets. In many cases, the portion of the small activity is excluded from the predictive value of the inherent class because an influence by noises is large. This is because when the data of the small activity is included in the learning, a predicting precision deteriorates.

Although the adaptive process is executed every class which was sorted as mentioned above, as an adaptive process, a system for performing a predictive arithmetic operation using predictive coefficients which have previously been learned and a system for learning predictive values by the center of gravity method have been proposed. As a condition to perform the learning, it is necessary to prepare a target teaching signal.

Figure 5:
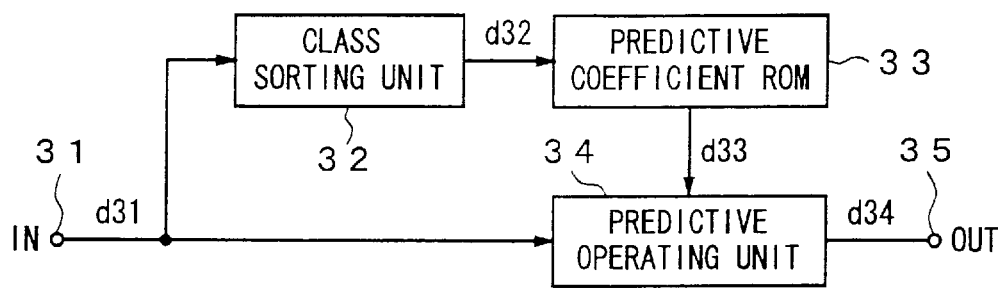
FIG. 5 is a block diagram showing an example of a class sort adaptive processing circuit using a predicting method to which the invention can be applied.

A predicting method whereby the predictive arithmetic operation using the predictive coefficients of every class which have previously been formed by learning is executed by using the teaching signal will now be described. An example of a predictive equation in case of predicting a pixel value at the position which is more detailed than the input pixel position is shown in the following equation (4). Predictive taps are formed from nine near pixels x0 to x8 including a target pixel x4, thereby forming the optimum predictive value.

$$x' = \sum_{i=0}^{i=8} w_i \times x_i = w_0 \times x_0 + \ldots + w_8 \times x_8 \quad (4)$$

where, x': optimum predictive value
xi: input pixel value
Wi: predictive coefficient FIG. 5 shows a constructional example of a class sort adaptive process using the predicting method. An input signal d31 which is supplied from an input terminal 31 is sent to a class sorting unit 32 and a predictive operating unit 34. The class sorting unit 32 executes a class sort as mentioned above on the basis of a feature of a waveform of the input signal d31. A sorting result, namely, a class d32 is supplied to a predictive coefficient ROM 33. Predictive coefficients corresponding to the classes have previously been stored in the predictive coefficient ROM 33. The predictive coefficient d33 corresponding to the class d32 supplied is read out from the predictive coefficient ROM 33 and is supplied to the predictive operating unit 34. In the predictive operating unit 34, a predictive tap is formed from the input signal d31 and a product sum arithmetic operation of the equation (4) is executed by using the predictive tap and the predictive coefficient d33. An arithmetic operation result is outputted as an optimum predictive value d34 from the predictive operating unit 34 through an output terminal 35.

The predictive coefficients which are read out from the predictive coefficient ROM 33 and are used for the predicting method have previously been formed by learning. A learning method will now be described. An example of forming the predictive coefficients by a method of least square on the basis of a linear combination model of the equation (4) is shown. The method of least square is applied as follows. As a general example, the following equation (5) is considered while assuming that X is set to input data, W is set to a predictive coefficient, and Y is set to a predictive value.

Observation equation: $XW = Y$  (5)

$$X = \begin{bmatrix} x_{11} & x_{12} & \ldots & x_{1n} \\ x_{21} & x_{22} & \ldots & x_{2n} \\ \vdots & \vdots & \ldots & \vdots \\ x_{m1} & x_{m2} & \ldots & x_{mn} \end{bmatrix}, W = \begin{bmatrix} w_1 \\ w_2 \\ \vdots \\ w_n \end{bmatrix}, Y = \begin{bmatrix} y_1 \\ y_2 \\ \vdots \\ y_m \end{bmatrix} \quad (6)$$

The method of least square is applied to the data collected by the foregoing observation equational. In the example of the equation (4), n=9 and m indicates the number of learning data. Residual equations (7) will now be considered on the basis of the observation equation of the equation (5). Residual equation:

$$XW = Y + E, E = \begin{bmatrix} e_1 \\ e_2 \\ \vdots \\ e_m \end{bmatrix} \quad (7)$$

From the residual equations (7), it is considered that the most probable value of each wi is obtained when the conditions which minimize $$\sum_{i=1}^{m} e_i^2$$

are satisfied. Namely, it is sufficient to consider the conditions of the following equation (8).

$$e_1 \frac{\partial e_1}{\partial w_i} + e_2 \frac{\partial e_2}{\partial w_i} + \ldots + e_m \frac{\partial e_m}{\partial w_i} = 0 \quad (8)$$

$(i = 1, 2, \ldots, n)$

It is sufficient to consider (n) conditions based on (i) of the equation (8) and to calculate w1, w2, . . . , and wn which satisfy the conditions. Therefore, the following equation (9) is obtained from the residual equations (7).

$$\frac{\partial e_i}{\partial w_1} = x_{i1}, \frac{\partial e_i}{\partial w_2} = x_{i2}, \ldots, \frac{\partial e_i}{\partial w_n} = x_{in} \quad (9)$$

$(i = 1, 2, \ldots, m)$

From the equations (8) and (5), the following equations (10) are obtained.

$$\sum_{i=1}^{m} e_i x_{i1} = 0, \sum_{i=1}^{m} e_i x_{i2} = 0, \ldots, \sum_{i=1}^{m} e_i x_{in} = 0 \quad (10)$$

The following normal equations (11) are derived from the equations (7) and (10).

$$\begin{cases} \left(\sum_{j=1}^{m} x_{j1}x_{j1}\right)w_1 + \left(\sum_{j=1}^{m} x_{j1}x_{j2}\right)w_2 + \ldots + \left(\sum_{j=1}^{m} x_{j1}x_{jn}\right)w_n = \left(\sum_{j=1}^{m} x_{j1}y_j\right) \\ \left(\sum_{j=1}^{m} x_{j2}x_{j1}\right)w_1 + \left(\sum_{j=1}^{m} x_{j2}x_{j2}\right)w_2 + \ldots + \left(\sum_{j=1}^{m} x_{j2}x_{jn}\right)w_n = \left(\sum_{j=1}^{m} x_{j2}y_j\right) \\ \vdots \\ \left(\sum_{j=1}^{m} x_{jn}x_{j1}\right)w_1 + \left(\sum_{j=1}^{m} x_{jn}x_{j2}\right)w_2 + \ldots + \left(\sum_{j=1}^{m} x_{jn}x_{jn}\right)w_n = \left(\sum_{j=1}^{m} x_{jn}y_j\right) \end{cases} \quad (11)$$

As for the normal equations (11), since the equations of the same number as the number (n) of unknowns can be set, the most probable value of each wi can be obtained. Simultaneous equations are solved by using a sweeping-out method (elimination method of Gauss-Jordan). By solving the simultaneous equations, the predictive coefficients are stored into a memory medium such as an ROM or the like every class. The ROM in which the predictive coefficients have been stored is used as a predictive coefficient ROM 33.

Figure 6:
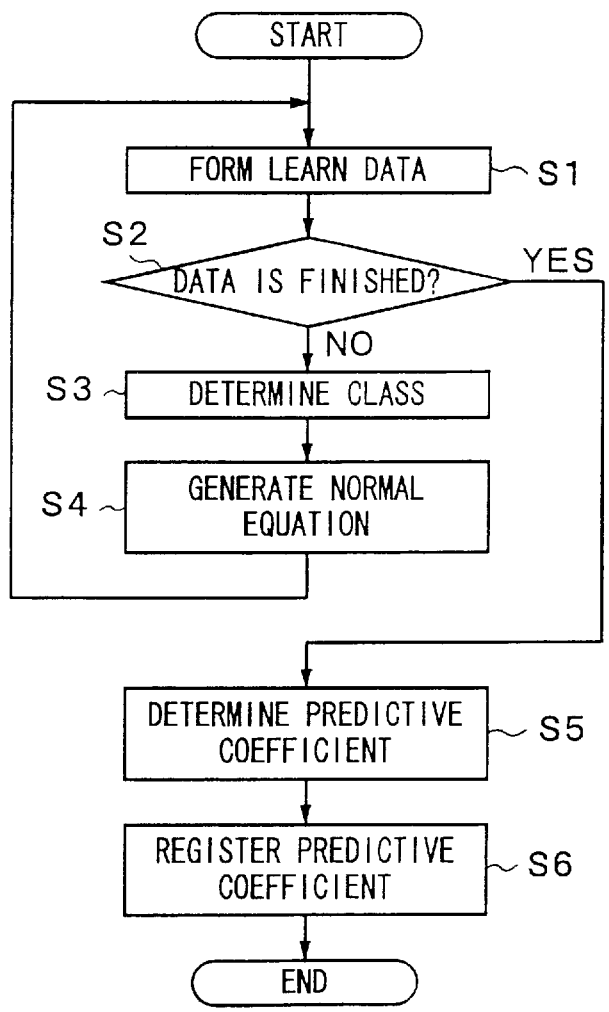
FIG. 6 is a flowchart showing an example of a learning method of predictive coefficients of the motion vector detecting apparatus of the invention.

FIG. 6 shows a flowchart as an example of a learning method of the predictive coefficients using the foregoing method of least squares. According to the flowchart, the control of the learning process is started from step S1 and an input signal to perform a learning and a teaching signal serving as a prediction target are prepared in the formation of learning data in step S1. First, in the determination of a class in step S3, a class sort is performed for the input signal. As mentioned above, a process such as an ADRC or the like is used and a class is formed on the basis of a waveform feature of the input signal. The foregoing normal equations (11) are formed from a pixel value of a predictive tap which is formed by the input signal and a teaching signal value every class.

Data in which a dynamic range in the block near the target data is smaller than a predetermined threshold value, namely, an activity is low doesn't need to be treated as learning data. This is because when the ADRC is used, the data of a small dynamic range is easily influenced by noises. In a discriminating step S2 about the end of data, if the processes of all of the input data, for example, the data of one frame or one field are finished, a processing routine advances to step S5 to decide a predictive coefficient. If NO, the processing routine advances to step S3 to decide a class.

In step S3, the class is determined on the basis of the pixel value near the target data as mentioned above. In step S4, a normal equation of the foregoing equations (11) is formed. After completion of the processes of all data, a processing routine advances to step S5 from step S2 about the end of the data. The foregoing sweeping-out method is used as a method of solving the simultaneous equations in which the normal equation of the equations (11) of every class is solved. In step S6, the predictive coefficient is registered into memory means such as an ROM or the like divided into addresses per class. The learning flowchart is finished. The predictive coefficient of the class sort adaptive process using the predicting method is formed by the foregoing learning process.

Figure 7:
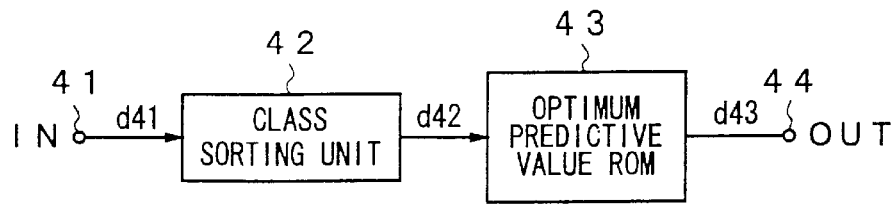
FIG. 7 is a block diagram showing an example of a class sort adaptive processing circuit using a center of gravity method to which the invention can be applied.

A case of using a center of gravity method as an adaptive processing method of the class sort adaptive process will now be described. According to the center of gravity method, a center of gravity of a distribution of the teaching signal which is used for learning is previously calculated every class and a calculation value is stored as an optimum predictive value into an ROM or the like and is outputted as an optimum predictive value of every class. FIG. 7 shows an example of a construction of the general class sort adaptive process using the center of gravity method. An input signal d41 which is supplied from an input terminal 41 is sent to a class sorting unit 42. The class sorting unit 42 executes the class sort as mentioned above on the basis of a feature of a waveform of the input signal d41. A sort result, namely, a class d42 is supplied to an optimum predictive value ROM 43. A predictive value corresponding to each class has previously been stored in the optimum predictive value ROM 43. The optimum predictive value d43 corresponding to the class d42 supplied is read out from the optimum predictive value ROM 43 and is outputted from an output terminal 44.

Figure 8:
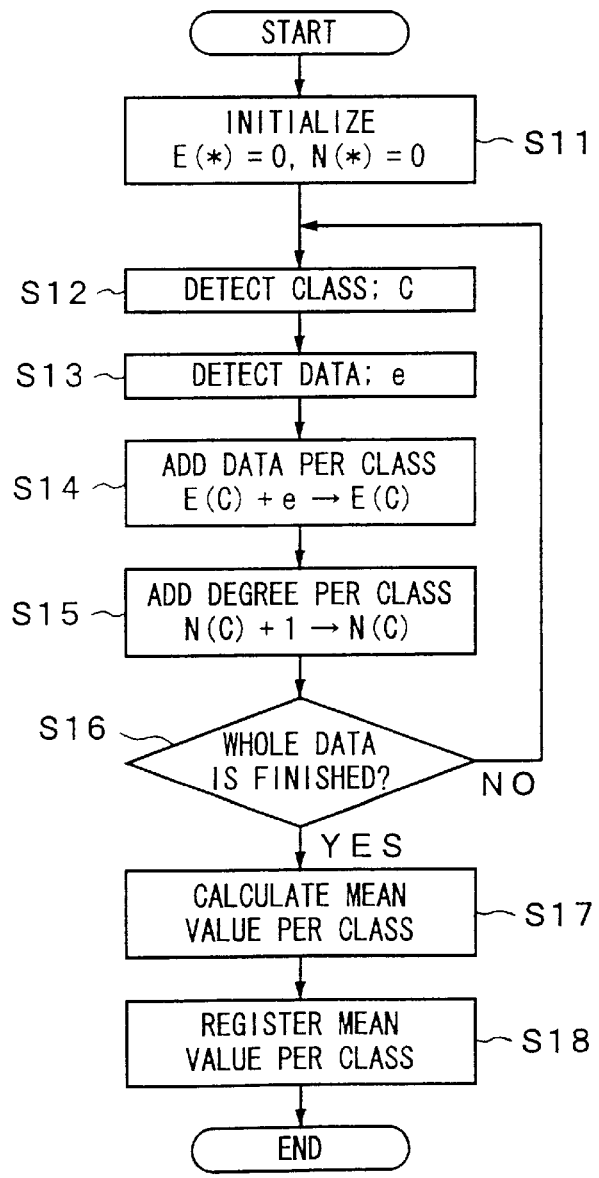
FIG. 8 is a flowchart showing an example of a learning method of the center of gravity method of the motion vector detecting apparatus of the invention.

FIG. 8 shows a flowchart for explaining an example of the learning method of a predictive value by the center of gravity method. Upon initialization in step S11, data of 0 is written into a data table E(*) of a class and a degree counter N(*) of the class as a preparation for performing the learning. "*" denotes all classes, the data table is set to E(C0), and the degree counter for a class C0 is set to N(C0). After completion of a process in step S11, a processing routine advances to step S12.

In step S12, a class C is determined from the data near the learning target pixel. For example, in case of applying the 1-bit ADRC to near eight pixels including a target pixel as shown in the foregoing example, the data is sorted into 128 classes. As a method of class sort, in addition to the ADRC as mentioned above, another sorting method such as PCM expression, DPCM, BTC, VQ, DCT, Hadamard transformation, or the like is considered. In case of considering an activity of a block constructed by the class sort target data, it is also considered that the number of classes is increased by only the number of sort kinds due to the activity.

In step S13, a target teaching signal e is detected. In step S14, the teaching signal e is added every class C. In step S15, the degree counter N(C) of the learning data of class C is increased by "+1". In step S16, a check is made to see if the repeating processes in steps S12 to S15 have been finished with respect to all of the learning target data. When the learning of all data is finished in step S16, step S17 follows. If the processes for the learning targets of all data are not finished yet, the processing routine advances to step S12. Namely, in step S16, until the learning of all data is finished, the processes in steps S12 to S15 are repetitively executed. The data tables E(*) of all classes corresponding to the degree counters N(*) of all classes are formed.

In the calculation of the mean value per class in step S17, a data integration value as contents of the data table E(*) of each class is divided by the degree of the degree counter N(*) of the corresponding class, thereby calculating the mean value of each class. This process is equivalent to that the center of gravity of the distribution of the teaching signals is calculated. The mean value is set to the optimum predictive value of each class by the center of gravity method. In the registration of the mean value per class in step S18, by registering the optimum predictive value corresponding to each class into the memory means such as an ROM or the like, the learning by the center of gravity method, namely, the processing routine of this flowchart is finished. In the learning step as mentioned above, in order to eliminate an influence by noises, it is also considered to exclude the case of a small activity from the learning targets. By the foregoing predicting method and center of gravity method, the pixel value serving as a position that is more detailed than the pixel can be predicted.

A specific example of a motion vector detecting method using a class sort adaptive process will now be described hereinbelow.

(1) Motion vector detecting method of obtaining a motion evaluation value by the class sort adaptive process.

Figure 4:
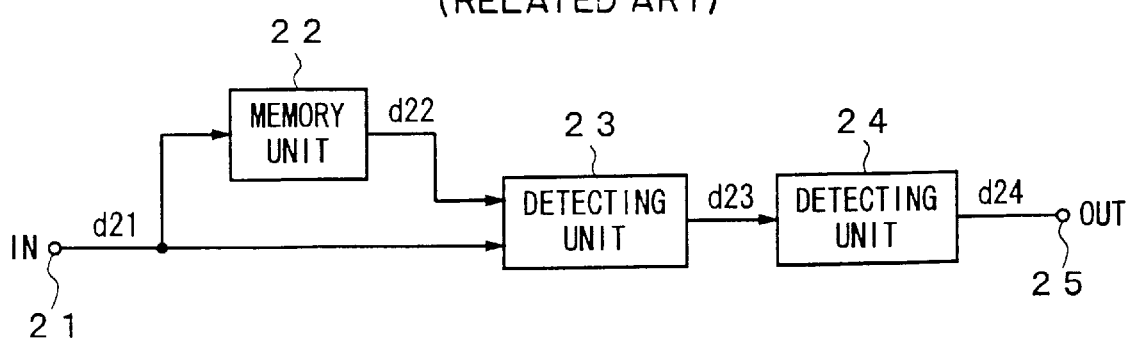
FIG. 4 is a block diagram showing a conventional motion vector detecting apparatus.

An embodiment of the invention will now be described with reference to the drawings. First, in case of detecting a motion vector of a below-pixel precision, as shown in the related art, the construction of FIG. 4 is presumed. Namely, the detecting unit 23 detects a motion vector of a pixel precision. A motion vector of a below-pixel precision is detected by using the motion evaluation value detected by the detecting unit 23. Hitherto, by applying a linear interpolation to the motion evaluation value, the minimum position of the motion evaluation value at the below-pixel position is calculated. In the embodiment, the motion evaluation value at each below-pixel position is predicted by the class sort adaptive process and the minimum position of the motion evaluation value in a target range is newly detected, thereby obtaining a motion vector of a below-pixel precision.

In the embodiment, an input signal which is used for the class sort adaptive process is a motion evaluation value that is defined by the equation (1). To execute a learning, it is necessary to prepare a target teaching signal. To predict a motion evaluation value at a below-pixel position, the motion evaluation value at the below-pixel position is prepared as a teaching signal for learning. For example, a signal system of a high pixel density such as a video signal or the like of HD (High Definition) super HD, UDTV, or the like is used for the purpose of learning, thereby detecting a motion evaluation value corresponding to the below-pixel position upon prediction. The detected motion evaluation value is set to the teaching signal.

Figure 9:
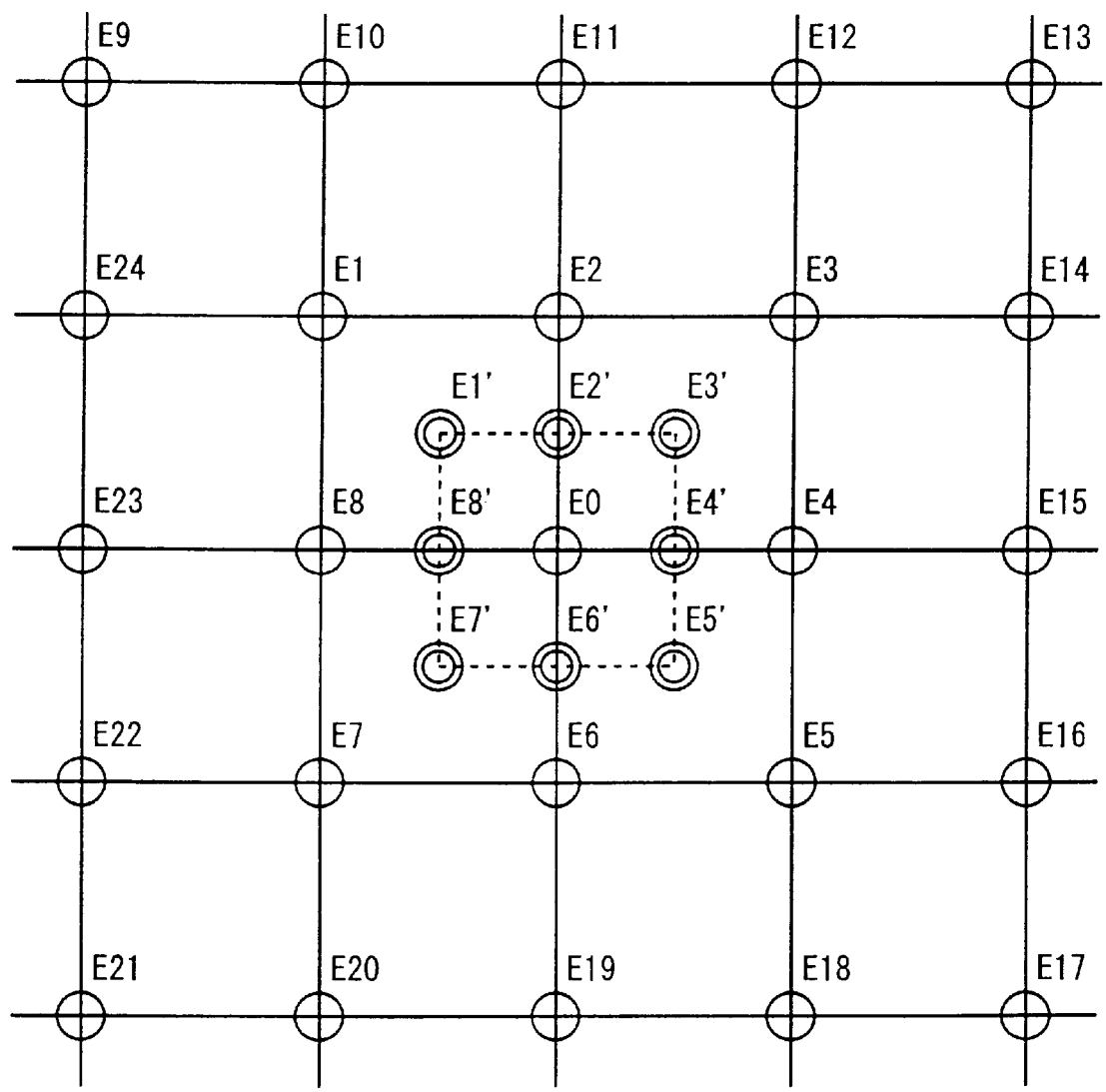
FIG. 9 is a schematic diagram which is used for explanation of the motion evaluation values according to the invention.

An adaptive process for executing a predictive arithmetic operation using the predictive coefficient of every class which has previously been formed by the learning by using the teaching signal will now be described. FIG. 9 shows an example of an arrangement of motion evaluation values. For example, a case of constructing predictive taps by 25 taps of motion evaluation values E0 to E24 and predicting motion evaluation values En' (n=1 to 8) at the below-pixel positions will now be considered. As mentioned above, teaching signals corresponding to the motion evaluation values En' are prepared for learning.

$$E' = \sum_{i=0}^{i=24} w_i \times E_i = w_0 \times E_0 + \ldots + w_{24} \times E_{24} \quad (12)$$

where, E': predictive value of a motion evaluation value

Ei: motion evaluation value wi: predictive coefficient

For example, in case of adapting the foregoing 1-bit ADRC to nine data E0 to E8 in FIG. 9 and sorting into 12 classes, motion evaluation values at the below-pixel positions are predicted by a product sum arithmetic operation of the predictive coefficient and motion evaluation value which were formed every class. A circuit construction of the class sort adaptive process is similar to FIG. 5. In place of the pixel value, a motion evaluation value d31 at a pixel position is supplied from the input terminal 31 and sent to the class sorting unit 32 and predictive operating unit 34. The class sorting unit 32 forms a class corresponding to the motion evaluation value d31 on the basis of the class sorting process as mentioned above and is supplied as d32 to the predictive coefficient ROM 33. The predictive coefficient is read out from the predictive coefficient ROM 33 by using the supplied class d32 as an address. The read-out predictive coefficient is supplied as d33 to the predictive operating unit 34. The predictive operating unit 34 executes the predictive arithmetic operation of the equation (4) by using the motion evaluation value d31 and predictive coefficient d33, thereby obtaining the predictive value d34 serving as a motion evaluation value at the below-pixel position. The predictive value d34 is outputted from the output terminal 35 as mentioned above.

In step S1 in the flowchart shown in FIG. 6, for example, the learning data is formed from the motion evaluation value at the pixel position and the motion evaluation value at the below-pixel position. As shown in FIG. 9, the motion evaluation value at the pixel position near the target data and the motion evaluation value at the below-pixel position near the target data are e set of learning data.

Figure 10:
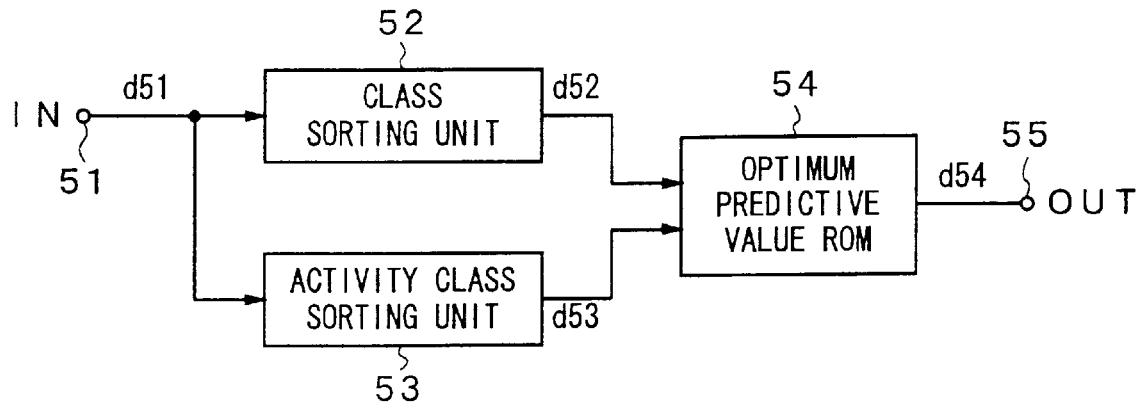
FIG. 10 is a block diagram showing another embodiment of a motion vector detecting apparatus to which the invention can be applied.

As an example of a class sort shown in FIG. 5 mentioned above, in addition to the method using the ADRC or the like, there is also a case of increasing the number of classes by combining the activity of the motion evaluation value. Another embodiment of a circuit construction in this instance is shown in FIG. 10. A motion evaluation value d51 at a pixel position which is supplied from an input terminal 51 is supplied to a class sorting unit 52 and an activity class sorting unit 53. The class sorting unit 52 executes a class sort on the basis of the motion evaluation value d51 as mentioned above. The class is supplied as d52 to an optimum predictive value ROM 54.

The activity class sorting unit 53 executes a class sort on the basis of the activity of the supplied motion evaluation value d51. The formed class is supplied as d53 to the optimum predictive value ROM 54. In the optimum predictive value ROM 54, an address is designated by the classes d52 and d53 and the motion evaluation-value at the below-pixel position is read out. The read-out motion evaluation value is previously obtained by the learning by the center of gravity method and is outputted as d54 from an output terminal 55.

The foregoing class sort adaptive process becomes a process in the detecting unit 24 in the constructional example of the motion vector detecting block in FIG. 4. Hitherto, a detection of the motion vector of the below-pixel precision using the linear interpolation or the like has been executed in the detecting unit 24. In the embodiment, by applying the class sort adaptive process in order to obtain the motion evaluation value at the below-pixel position from the motion evaluation value at the pixel position, the detecting precision of the motion vector of the below-pixel precision which is detected from the motion evaluation value at the below-pixel position can be improved.

Figure 11:
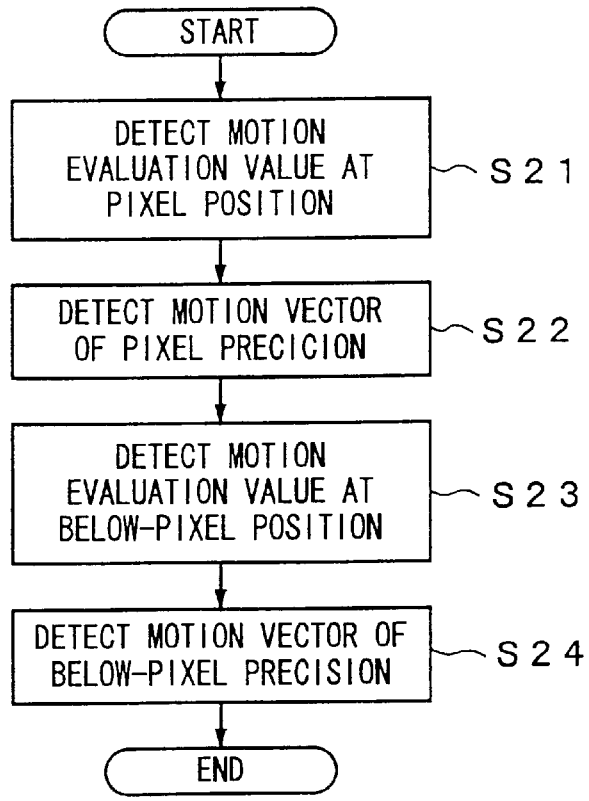
FIG. 11 is a flowchart showing an example of a method of detecting a motion vector of a below-pixel precision from the motion evaluation value at a pixel position of the invention.

FIG. 11 shows a flowchart of an example in which the motion vector of the below-pixel precision is detected on the basis of those methods. First in step S21, a motion evaluation value at each pixel position in a motion vector retrieval range is detected on the basis of the equation (1). In step S22, the minimum value is detected with respect to those motion evaluation values. Since the pixel position at which the minimum value is derived is located at the position where a correlation in the time direction is strongest, it corresponds to the motion vector of the pixel precision. The processes until now are processes which are executed in the detecting unit 23 shown in FIG. 4.

In step S23, by applying the class sort adaptive process to the motion evaluation value at each pixel position as mentioned above, the motion evaluation value at the below-pixel position is predicted. For example, the motion evaluation values at the below-pixel positions as shown at E1' to E8' shown in FIG. 9 are predicted. In step S24, the minimum value of the motion evaluation values is detected from among the motion evaluation values also including the motion evaluation value at the below-pixel position which was predicted as mentioned above. The pixel position corresponding to the detected minimum value corresponds to the final motion vector of the below-pixel precision. In this way, the motion vector of the below-pixel precision can be detected at a high precision.

According to the invention of (1), since the motion evaluation value at the below-pixel position is obtained from the motion evaluation value at the pixel position by the class sort adaptive process, the motion vector of the below-pixel precision can be detected. Further, the precision of the detected motion vector of the below-pixel precision is improved.

(2) Motion vector detecting method according to the data after completion of the class sort adaptive process.

Figure 12:
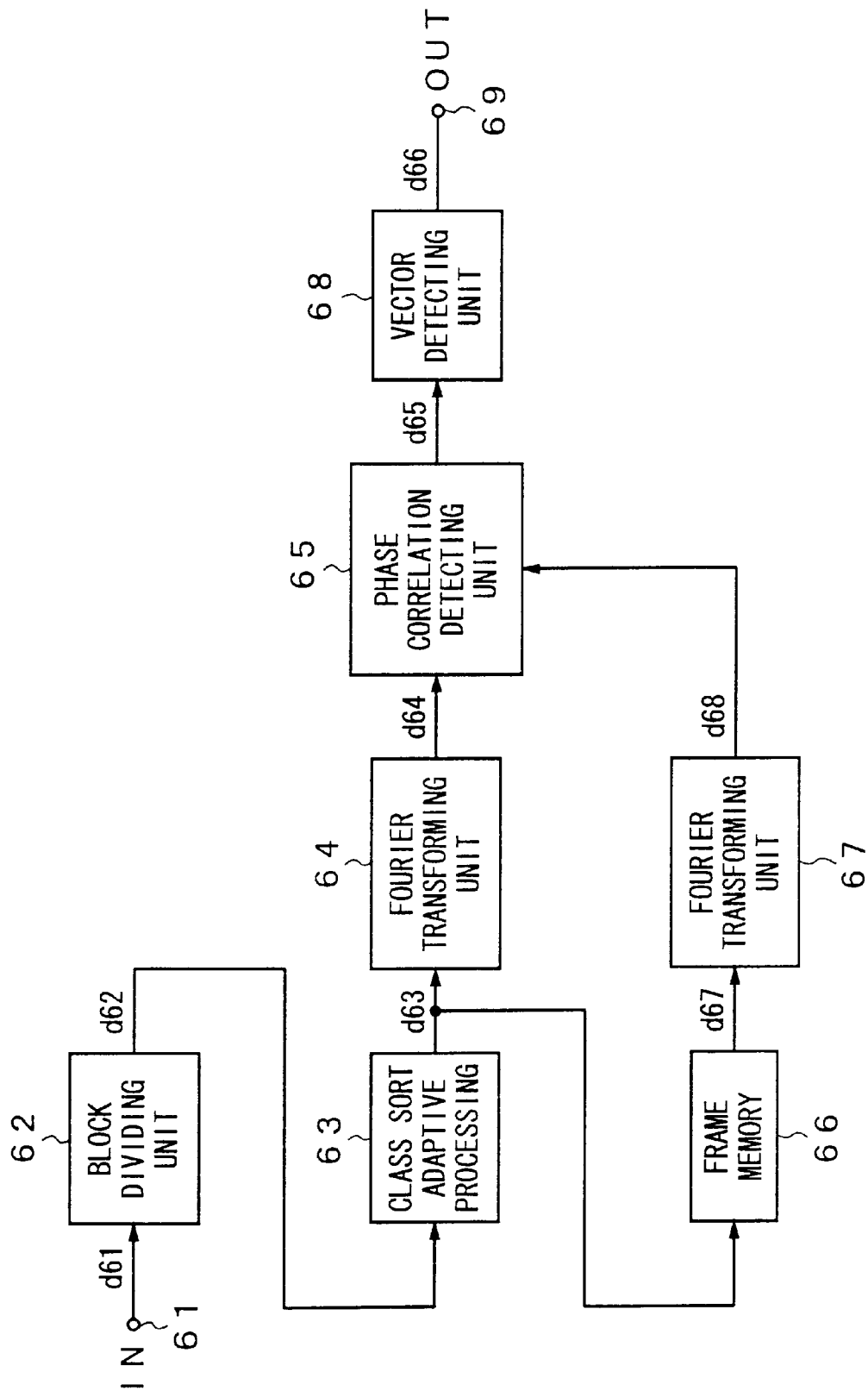
FIG. 12 is a diagram showing an embodiment of a motion vector detecting apparatus to which the invention is applied.

The second embodiment will now be described hereinbelow. According to the embodiment, a pixel value at the position which is more detailed than the original pixel position is predicted by using the class sort adaptive process, thereby performing a motion detection on the basis of the pixel value. The invention will now be described with reference to the drawings. FIG. 12 shows a block diagram of a motion vector detecting apparatus to which the invention is applied. A phase correlation method is used as a motion detecting method. This is because by using the phase correlation method, a largest improving effect of the motion vector detecting precision due to the improvement of the spatial frequency characteristics of a target image can be expected. An image d61 is supplied from an input terminal 61. The supplied image signal d61 is sent to a block dividing unit 62. The block dividing unit 62 divides the supplied image signal d61 into predetermined blocks. The image signal divided into the blocks is supplied as d62 to a class sort adaptive processing circuit 63. The class sort adaptive processing circuit 63 executes the class sort adaptive process as mentioned above to the image signal d62. A pixel value at the position which is more detailed than the original pixel position is predicted. An image signal d63 including a prediction result is supplied to a Fourier transforming unit 64 and a frame memory 66. The fourier transforming unit 64 executes a Fourier transformation to the image signal d63 supplied.

In the frame memory 66, the supplied image signal d63 is delayed by a time of one frame. After that, the delayed signal is supplied as an image signal d67 to a Fourier transforming unit 67. The Fourier transforming unit 67 executes a Fourier transformation to the image signal d67 supplied, namely, the block data of one frame before which was processed by the Fourier transforming unit 64. An arithmetic operation result d64 of the Fourier transforming unit 64 and an arithmetic operation result d68 of the Fourier transforming unit 67 are supplied to a phase correlation detecting unit 65. The phase correlation detecting unit 65 detects a phase correlation (phase difference matrix) exp(-jφ), which will be explained hereinlater, in accordance with the two arithmetic operation results d64 and d68 supplied. The detected phase correlation exp(-jφ) is supplied to a vector detecting unit 68. In the vector detecting unit 68, an inverse Fourier transformation and a peak detection of the phase correlation function are executed to the phase correlation exp(-jφ). Finally, a motion vector d66 of, a precision higher than one pixel unit can be derived. The motion vector d66 is outputted from an output terminal 69.

As mentioned above, in FIG. 12, in case of detecting the motion vector of a precision higher than one pixel unit, by applying the class sort adaptive process to the image signal as a target, the pixel value at the position which is more detailed than the pixel position is predicted. By using the phase correlation method to the image signal including the predicted detailed pixel, the motion vector of a precision higher than one pixel unit can be detected.

The phase correlation method which is used in the invention will now be described in detail. The phase correlation method is applied to the phase correlation detecting units 14 and 65. According to the phase correlation method, the Fourier transformation is executed to each of the block data at the same position of the present image and past image as mentioned above, a deviation amount of the phase is detected in a frequency region, and a motion vector is detected through the inverse Fourier transformation by the phase term. Therefore, a cross correlation function $S_A(\tau)$ of two signals g1 and g2 is first defined by the following equation (13).

$$S_A(\tau) = \int_{-\infty}^{\infty} g_1(t) g_2(t+\tau) dt \quad (13)$$

$$(-\infty < \tau < \infty)$$

A Fourier transformation $S_A(\omega)$ of the cross correlation function $S_A(\tau)$ is called a cross power spectrum and as shown by the following equation (14)

$$S_A(\omega) = G1^*(\omega) G2(\omega) \quad (14)$$

where, $G2(\omega)$: complex conjugation of the Fourier transformation of $g1(\tau)$ $G1^*(\omega)$: Fourier transformation of $g2(t)$ According to the cross correlation of two signals in the time region, an expression using the cross power spectrum can be obtained in the frequency region. By using it, the phase correlation method is a method of detecting a phase difference between two signals. A procedure of the motion vector detection using the phase correlation method will be shown below.

As a first step, two target images g1 and g2 (block size: M×N) are set. As a second step, the Fourier transformation is executed to the target images g1 and g2, thereby obtaining G1 and G2.

$$G_1(k_1, k_2) = \sum_{i_1=0}^{M-1} \sum_{i_2=0}^{N-1} g_1(i_1, i_2) \exp\left(-j\frac{2\Pi k_1}{M} i_1\right) \exp\left(-j\frac{2\Pi k_2}{N} i_2\right) \quad (15)$$

$$G_2(k_1, k_2) = \sum_{i_1=0}^{M-1} \sum_{i_2=0}^{N-1} g_2(i_1, i_2) \exp\left(-j\frac{2\Pi k_1}{M} i_1\right) \exp\left(-j\frac{2\Pi k_2}{N} i_2\right) \quad (16)$$

$$(0 \le k1 \le M-1, 0 \le k2 \le N-1)$$

In the third step the following phase correlation (phase difference matrix) exp(-jφ) is calculate d by u,sing cross power spectra G1 and G2*. φ corresponds to a phase difference between two image blocks.

$$exp(-j\phi) = (G1 \cdot G2^*)/|G1 \cdot G2^*| \quad (17)$$

In the fourth step, a phase correlation function d(i1, i2) is obtained by the following inverse Fourier transformation for the phase correlation (phase difference matrix).

$$d(i_1, i_2) = \frac{1}{M \cdot N} \sum_{k_1=0}^{M-1} \sum_{k_2=0}^{N-1} \exp(-j\phi) \exp\left(j\frac{2\Pi i_1}{M} k_1\right) \exp\left(j\frac{2\Pi i_2}{N} k_2\right) \quad (18)$$

$$(0 \le i1 \le M-1, 0 \le i2 \le N-1)$$

In the fifth step, the position of the peak which is detected in the phase correlation function d(i1, i2) corresponds to the motion vector. The motion vector using the phase correlation function is detected by the following procedure.

When summarizing the processes of the embodiment of the invention of (2) mentioned above, the block division is performed to the inputted image signal, the image signal which was divided into the blocks is subjected to the class sort adaptive process (predicting method or center of gravity method), the pixel value at the position that is more detailed than the pixel position is predicted, the image signal including the predicted pixel value is Fourier transformed, the phase correlation between the present image are and the past image is detected by applying the phase correlation method, and the motion vector of a precision higher than one pixel unit is detected on the basis of the detected phase correlation.

Although the motion vector detecting method, based on the phase correlation method has been explained above, a block matching method, a gradient method, or the like can be also used as a motion vector detecting method.

According to the invention of (2), the pixel value at the position which is more detailed than the pixel position is predicted by the class sort adaptive process and the motion vector of a precision higher than one pixel unit can be detected on the basis of the prediction result. The precision of the detected motion vector is improved.

Further, according to the invention, a compressing efficiency is improved by applying the method of the invention to a high efficient encoding.

(3) Motion vector detecting method of detecting at two stages

Figure 13:
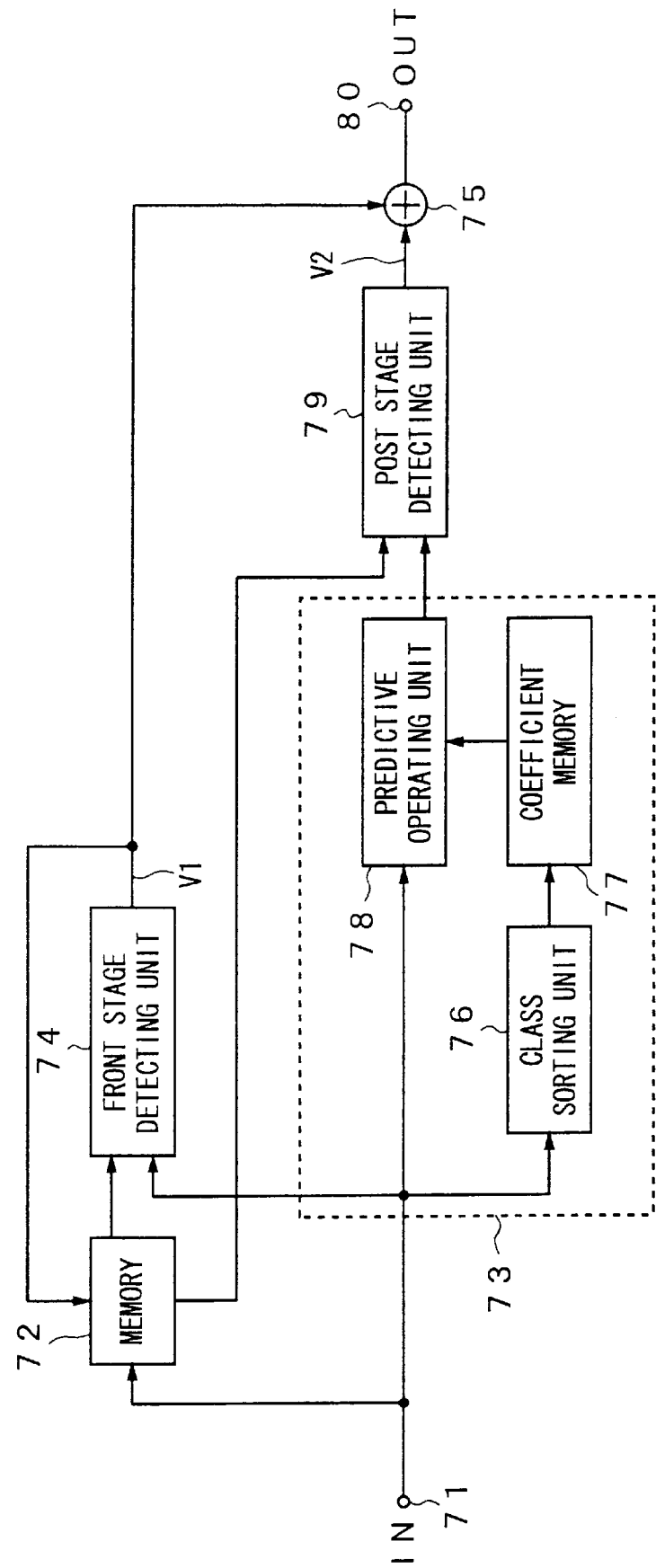
FIG. 13 is a diagram showing an embodiment of the motion vector detecting apparatus according to the invention.

The third embodiment of the invention will now be described hereinbelow with reference to the drawings. FIG. 13 shows a construction of the embodiment of the invention. In FIG. 13, a digital image signal is supplied from an input terminal 71. The input image signal is supplied to a memory 72 and a class sort adaptive processing unit 73. A detecting unit 74 at the front stage for detecting a first motion vector V1 by using the image signal stored in the memory 72 is provided.

Any one of the foregoing existing methods can be used as a method of detecting the motion vector in the front stage detecting unit 74. For example, the front stage detecting unit 74 detects a motion vector of a pixel position precision by using the foregoing block matching method.

In the example of FIG. 2, the motion evaluation value E is calculated by the equation (1) at each coordinate of the X·Y points. Among the coordinates of the X·Y points, the coordinates in which the evaluation value indicates the minimum value are set to the first motion vector V1. Since the evaluation value which is calculated here is obtained every pixel, the motion vector V1 which is detected corresponds to the pixel position precision of the input image signal.

The first motion vector V1 detected by the front stage detecting unit 74 is outputted to an adder 75 and is also supplied to the memory 72. The memory 72 includes, for example, a frame memory and its address control unit. By controlling the addresses in the frame memory by the motion vector V1, a motion compensation is performed. Namely, a whole image of one frame is moved in correspondence to the first motion vector V1 detected. If the motion between frames is just integer times as large as one pixel, the motion compensated image coincides with the image of the preceding frame.

The class sort adaptive processing unit 73 is constructed by a class sorting unit 76 for performing a class sort on the basis of the waveform of the input image signal; a coefficient memory 77 to which a class code indicative of a class generated by the class sorting unit 76 is supplied as an address; and a predictive operating unit 78 for forming a predictive value by a linear combination of a coefficient value read out from the memory 77 and a plurality of pixel values of the input image signal. Peripheral pixels around the prediction target pixel are used as such a plurality of pixels. The class sort adaptive processing unit 73 predicts a pixel value at a position which is more detailed than the pixel position precision of the input image signal. For example, a new pixel value is predicted at the position of ½ of a pixel pitch of the input image signal in the horizontal and vertical directions. The predicted detailed image signal is supplied to a post stage detecting unit 79.

The motion compensated image signal from the memory 72 and the predictive image signal from the processing unit 78 are supplied to the post stage detecting unit 79. The motion compensated image signal is used as a past (for example, preceding frame) reference image in the post stage detecting unit 79. The post stage detecting unit 79 detects a second motion vector V2 by a gradient method. The motion vector V2 is a motion vector of a precision corresponding to the more detailed position. The second motion vector V2 is supplied to the adder 75 and is added to the first motion vector V1 from the front stage detecting unit 74. An output of a final motion vector is derived from the adder 75 to an output terminal 80. The first motion vector V1 corresponds to the pixel position precision of the input image signal and has an integer value with respect to the horizontal and vertical directions. On the other hand, the second motion vector V2 corresponds to the pixel position precision of the detailed image and has a decimal value or is equal to 0 with respect to the horizontal and vertical directions.

Although the gradient method which is used in the post stage detecting unit 79 will be described, a fundamental idea is shown by the following equation.

(pixel differential value in the time direction) = (19)

(gradient of the pixel value in the space) × (motion amount)

From the equation (19), the motion vector V2 is calculated by the following equation (20).

$$V2 = \delta T/\delta S \quad (20)$$

where, V: motion vector
 δS: gradient of the pixel value in the space
 δT: pixel differential value in the time direction By expanding the equation (20) into a two dimension (horizontal and vertical direction), the motion vector detection by the gradient method for the image as a target is executed. In the equation (20), it is assumed that the pixel value gradient in the space is set to a constant value for the motion amount. However, at the time of a general motion vector detection, since the pixel value gradient in the space changes, there is a case where a detection error occurs. In the embodiment of the invention, since the motion vector detection of a 2-stage construction is executed, it is sufficient to detect only the below-pixel precision component in the second motion vector detection. According to the gradient method, although there is a case where the detection error occurs when a large motion vector is detected, for a small motion, a motion vector can be detected at a high precision by a small calculation amount. Namely, many portions of a motion are compensated by the first motion vector V1. After that, by applying the gradient method, a detection error can be reduced. Further, by forming the detailed image of the below-pixel position precision by using the class sort adaptive process and by using the gradient method, the motion vector of the below-pixel position precision can be detected.

Figure 14:
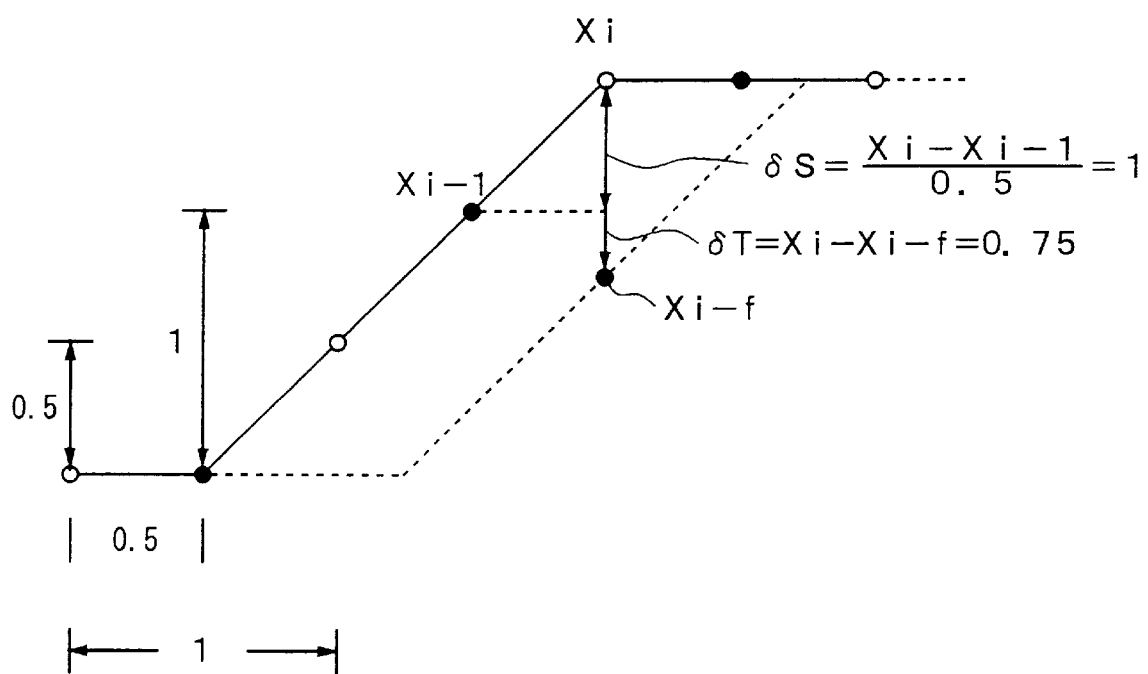
FIG. 14 is a diagram schematically showing a motion vector detecting process according to a gradient method in a post stage detecting unit.

FIG. 14 schematically shows processes when the post stage detecting unit 79 detects a motion vector by the gradient method. An axis of abscissa denotes the position in the horizontal direction and an axis of ordinate indicates a pixel value. A waveform shown by a solid line indicates a detailed image (for example, a pitch is ½ of the original pitch) which was predicted by the class sort adaptive processing unit 73. The waveform shown by a broken line indicates the past image after completion of the motion compensation which is supplied from the memory 72, for example, it indicates an image (reference image) of one frame before. The space gradient δS is calculated as a difference between the values xi and xi−1 of the neighboring pixels in the detailed image. For simplicity of explanation, the waveform shown in FIG. 14 is a waveform having a gradient of 1 and δS=1.

The pixel differential value δT in the time direction denotes a difference between the pixel value xi of the present frame and the value xi−f of the pixel of the preceding frame which exists at the same position as that of the above pixel. In the example of FIG. 14, δT=0.75. Therefore, the second motion vector is detected as V2=δT/δS=0.75. In the detailed image, since the space gradient δS is obtained, it is advantageous when satisfying a condition such that the space gradient is constant. The motion vector V2 of a precision corresponding to the pitch that is finer than the pitch of one pixel can be detected. Although FIG. 14 shows only the motion detection with respect to the horizontal direction, actually, the motion detection is also similarly performed with regard to the vertical direction. The motion vector V2 comprising components in both of the horizontal and vertical directions is formed. Further, the direction of the motion is expressed by a polarity of the motion vector.

FIG. 15 shows another embodiment of the invention. In a manner similar to the foregoing embodiment, the first motion vector V1 of the pixel position precision is detected by the front stage detecting unit 74, the second motion vector V2 at the position that is more detailed than the pixel position is detected by the post stage detecting unit 79, and the motion vectors V1 and V2 are added by the adder 75, thereby forming the final motion vector. According to another embodiment, as shown at 73' in FIG. 15, a predictive value memory 81 in which optimum predictive values have been stored is used as a class sort adaptive processing unit. Namely, the predictive values which have previously been obtained by the center of gravity method have previously been stored every class in the predictive value memory 81. The predictive value is read out from the memory 81 in correspondence to the class formed by the class sorting unit 76. The detailed image signal is outputted from the memory 81 to the post stage detecting unit 79.

The class sort adaptive processing unit 73' predicts a pixel value at the position that is more detailed than the pixel position by using the center of gravity method. According to the center of gravity method, a center of gravity of a distribution of teaching signals which are used for learning is previously calculated every class and the calculated value is stored as an optimum predictive value into an ROM or the like and is outputted as an optimum predictive value of each class. Therefore, the predictive values which were previously obtained have been stored in the memory 81. The optimum predictive value corresponding to the class generated by the class sorting unit 76 is read out from the memory 81 and is supplied to the post stage detecting unit 79. In a manner similar to the foregoing embodiment, the post stage detecting unit 79 forms the motion vector V2 corresponding to the precision of the position that is more detailed than the pixel position by using the motion compensated image signal from the memory 72 and the detailed predictive image signal from the adaptive processing unit 73'. The motion vectors V1 and V2 are added by the adder 75 and the final motion vector is taken out to the output terminal 80.

According to the embodiment of (3), the motion vector of the pixel position precision is detected by the front stage detecting unit, the motion vector of the below-pixel precision is detected by the post stage detecting unit, and the two motion vectors are synthesized, so that the final motion vector can be obtained. By using the different motion vector detecting methods at the front and post stages, the motion vector detection which can make the most of their advantages can be realized. Particularly, in case of using the gradient method for the post stage detecting unit in the 2-stage construction of the front stage detecting unit and the post stage detecting unit, after a large motion was compensated by the front stage, the local space gradient is used, so that a detection errors can be prevented. Further, since the gradient method is used, an increase in arithmetic operation amount and an increase in scale of hardware can be prevented.

By applying the present invention having those advantages to the high efficient encoding for compression of image data, a compressing efficiency can be improved.

Although the present invention has been described above with respect to the preferred embodiments but the invention is not limited to the foregoing embodiments but many modifications and variations are possible within the spirit and scope of the appended claims of the invention.

What is claimed is:

1. A motion vector detecting apparatus for detecting a motion vector at a below-pixel precision of an input image, comprising:

predicting means for predicting a pixel value at a position which is more detailed than a pixel position by using a class sort adaptive process to a target image signal; and motion vector detecting means for detecting the motion vector for the image signal including said predicted pixel values;

wherein said predicting means includes class forming means for executing a class sort to a pixel value to be predicted, thereby forming a class; memory means for storing a number of predictive coefficients which have previously been obtained by learning every class; and predictive value forming means for reading out said number of predictive coefficients corresponding to said class from said memory means and forming an optimum predictive value for the pixel value to be predicted by an arithmetic operation by a prediction equation.

2. An apparatus according to claim 1, wherein said motion vector detecting means executes a motion vector detection by a phase correlation method.

3. An apparatus according to claim 1, wherein said motion vector detecting means executes a motion vector detection by a block matching method.

4. A motion vector detecting method of detecting a motion vector of a precision higher than one pixel of an input image, comprising the steps of:

predicting a pixel value at a position which is more detailed than a pixel position by using a class sort adaptive process to a target image signal; and detecting a motion vector for the image signal including said predicted pixel values;

wherein the predicting step includes executing a class sort to a pixel value to be predicted, thereby forming a class; storing a number of predictive coefficients which have previously been obtained by learning every class in a memory means; and reading out said number of predictive coefficients corresponding to said class from said memory means and forming an optimum predictive value for the pixel value to be predicted by an arithmetic operation by a prediction equation.

5. A motion vector detecting apparatus for detecting a motion vector at a below-pixel precision of an input image, comprising:

first motion vector detecting means for detecting a motion vector of a pixel position precision of an input image signal;

predicting means for predicting a pixel value at a position which is more detailed than said pixel position by using a class sort adaptive process to said input image signal;

correcting means for correcting said image on the basis of the motion vector detected by said first motion vector detecting means;

second motion vector detecting means for detecting a motion vector between said corrected input image and the image including said predicted pixel value; and means for synthesizing said first and second motion vectors.

6. An apparatus according to claim 5, wherein said second motion vector detecting means detects a motion vector of a precision corresponding to said detailed position by a gradient method.

7. An apparatus according to claim 5, wherein said predicting means comprises:

class forming means for executing a class sort to the target image signal, thereby forming a class;

memory means for storing a predictive coefficient which has previously been obtained by learning every class; and predictive value forming means for reading out said predictive coefficient corresponding to said class from said memory means and forming an optimum predictive value by an arithmetic operation by a prediction equation.

8. An apparatus according to claim 7, wherein said prediction equation which is used in said predictive value forming means is a linear combination equation.

9. An apparatus according to claim 7, wherein when an activity of said target image signal is small, said image signal is excluded from learning targets and a learning is performed and said optimum predictive coefficient is obtained every class.

10. An apparatus according to claim 5 wherein said predicting means comprises:

class forming means for performing a class sort to the target image signal, thereby forming a class; and memory means for storing the optimum predictive value which has previously been obtained by learning every class.

11. An apparatus according to claim 10, wherein said optimum predictive value which is stored into said memory means is previously obtained by using a center of gravity method every class which is sorted on the basis of said target image signal.

12. An apparatus according to claim 10, wherein when an activity of said target image signal is small, said image signal is excluded from learning targets and a learning is performed and said optimum predictive value is obtained every class.

13. A method of detecting a motion vector of an image, comprising the steps of:

detecting a first motion vector of a pixel position precision of an input image signal;

predicting a pixel value at a position which is more detailed than a pixel position by using a class sort adaptive process to said input image signal;

correcting said input image on the basis of said first motion vector;

detecting a second motion vector between said corrected input image and an image including said predicted pixel value; and synthesizing said first and second motion vectors.

14. A motion vector detecting apparatus for detecting a motion vector of a below-pixel precision, comprising:

motion evaluation value detecting means for detecting a motion evaluation value detected from transmitted digital pixel data;

evaluation value predicting means for predicting a motion evaluation value at a position of a below-pixel precision by using a class sort adaptive process to said motion evaluation value; and motion vector detecting means for detecting a motion vector of a below-pixel precision from said predicted motion evaluation value;

wherein said predicting means includes class forming means for executing a class sort to a motion evaluation value to be predicted, thereby forming a class; memory means for storing a number of predictive coefficients which have previously been obtained by learning every class; and predictive value forming means for reading out said number of predictive coefficients corresponding to said class from said memory means and forming an optimum predictive value for the motion evaluation value to be predicted by an arithmetic operation by a prediction equation.

15. A motion vector detecting apparatus for detecting a motion vector of a below-pixel precision, comprising:

motion evaluation value detecting means for detecting a motion evaluation value detected from transmitted digital pixel data;

class sorting means for performing a class sort by using said motion evaluation value;

memory means for storing predictive coefficients which have previously been obtained by learning;

predictive value forming means for forming an optimum predictive value from an arithmetic operation of a prediction equation using said predictive coefficient read out in correspondence to said class and said motion evaluation value; and motion vector detecting means for detecting a motion vector of a below-pixel precision from said formed predictive value.

16. An apparatus according to claim 15, wherein said prediction equation which is used for said predictive value forming means is a linear combination equation.

17. An apparatus according to claim 15, wherein as for said predictive coefficients which are stored into said memory means, the predictive coefficients in which an activity of said motion evaluation value is small are excluded from learning targets and the learning is executed every class which is sorted on the basis of said motion evaluation value.

18. A motion vector detecting apparatus for detecting a motion vector of a below-pixel precision, comprising:

motion evaluation value detecting means for detecting a motion evaluation value detected from transmitted digital pixel data;

class sorting means for performing a class sort by using said motion evaluation value;

memory means for storing optimum predictive values which have previously been obtained by learning;

optimum predictive value forming means for forming said optimum predictive value corresponding to said class; and motion vector detecting means for detecting a motion vector of a below-pixel precision from said formed optimum predictive value.

19. An apparatus according to claim 18, wherein said optimum predictive values which are stored in said memory means are previously obtained by using a center of gravity method every class which is sorted on the basis of said motion evaluation value.

20. An apparatus according to claim 18, wherein as for said optimum predictive values which are stored in said memory means, the optimum predictive values in which an activity of said motion evaluation value is small are excluded from learning targets and the learning is executed every class which is sorted on the basis of said motion evaluation value.

21. An apparatus according to claim 18 wherein in said class sort, said motion evaluation value is directly sorted.

22. A motion vector detecting method of detecting a motion vector of a below-pixel precision, comprising the steps of:

detecting a motion evaluation value detected from transmitted digital pixel data;

predicting a motion evaluation value at a position of a below-pixel precision by using a class sort adaptive process to said motion evaluation value; and detecting the motion vector of the below-pixel precision from said predictive motion evaluation value;

wherein the predicting step includes executing a class sort to a motion evaluation value to be predicted, thereby forming a class; storing a number of predictive coefficients which have previously been obtained by learning every class in a memory means; and reading out said number of predictive coefficients corresponding to said class from said memory means and forming an optimum predictive value for the motion evaluation value to be predicted by an arithmetic operation by a prediction equation.

23. A motion vector detecting method of detecting a motion vector of a below-pixel precision, comprising the steps of:

detecting a motion evaluation value detected from transmitted digital pixel data;

performing a class sort by using said motion evaluation value;

storing predictive coefficients which have previously been obtained by learning;

forming an optimum predictive value from an arithmetic operation of a prediction equation using said predictive coefficient read out in correspondence to said class and said motion evaluation value; and detecting the motion vector of the below-pixel precision from said formed predictive value.

24. A motion vector detecting method of detecting a motion vector of a below-pixel precision, comprising the steps of:

detecting a motion evaluation value detected from transmitted digital pixel data;

performing a class sort using said motion evaluation value;

storing optimum predictive values which have previously been obtained by learning;

forming said optimum predictive value corresponding to said class; and detecting the motion vector of the below-pixel precision from said formed optimum predictive value.

25. An apparatus according to claim 1, wherein said prediction equation which is used in said predictive value forming means is a linear combination equation.

26. An apparatus according to claim 1, wherein when an activity of said target image signal is small, said image signal is excluded from learning targets and a learning is performed and a number of optimum predictive coefficients is obtained every class.

27. A motion vector detecting apparatus for detecting a motion vector at a below-pixel precision of an input image, comprising:

predicting means for predicting a pixel value at a position which is more detailed than a pixel position by using a class sort adaptive process to a target image signal; and motion vector detecting means for detecting the motion vector for the image signal including said predicted pixel value;

wherein said predicting means includes class forming means for performing a class sort to a pixel value to be predicted, thereby forming a class; and memory means for storing the optimum predictive value for the pixel value to be predicted which has previously been obtained by learning every class.

28. An apparatus according to claim 27, wherein said motion vector detecting means executes a motion vector detection by a phase correlation method.

29. An apparatus according to claim 27, wherein said motion vector detecting means executes a motion vector detection by a block matching method.

30. An apparatus according to claim 27, wherein said optimum predictive value which is stored into said memory means is previously obtained by using a center of gravity method every class which is sorted on the basis of said target image signal.

31. An apparatus according to claim 27, wherein when an activity of said target image signal is small, said image signal is excluded from learning targets and a learning is performed and said optimum predictive value is obtained every class.

32. A method for detecting a motion vector at a below-pixel precision of an input image, said method comprising the steps of:

predicting a pixel value at a position which is more detailed than a pixel position by using a class sort adaptive process to a target image signal; and detecting the motion vector for the image signal including said predicted pixel value;

wherein the predicting step includes performing a class sort to a pixel value to be predicted, thereby forming a class; and storing the optimum predictive value for the pixel value to be predicted which has previously been obtained by learning every class in a memory means.

33. A method according to claim 32, wherein the detecting step executes a motion vector detection by a phase correlation method.

34. A method according to claim 32, wherein the detecting step executes a motion vector detection by a block matching method.

35. A method according to claim 32, wherein said optimum predictive value which is stored into said memory means is previously obtained by using a center of gravity method every class which is sorted on the basis of said target image signal.

36. A method according to claim 32, wherein when an activity of said target image signal is small, said image signal is excluded from learning targets and a learning is performed and said optimum predictive value is obtained every class.

37. A method according to claim 4, wherein said prediction equation is a linear combination equation.

38. A method according to claim 4, wherein when an activity of said target image signal is small, said image signal is excluded from learning targets and a learning is performed and a number of optimum predictive coefficients is obtained every class.

39. A method according to claim 13, wherein the second motion vector detecting step detects a motion vector of a precision corresponding to said detailed position by a gradient method.

40. A method according to claim 13, wherein the predicting step includes executing a class sort to a pixel value to be predicted, thereby forming a class; storing a predicting coefficient which has previously been obtained by learning every class in a memory means; and reading out said predictive coefficient corresponding to said class from said memory means and forming an optimum predictive value for the pixel value to be predicted by an arithmetic operation by a prediction equation.

41. A method according to claim 40, wherein said prediction equation is a linear combination equation.

42. A method according to claim 40, wherein when an activity of said target image signal is small, said image signal is excluded from learning targets and a learning is performed and a number of optimum predictive coefficients is obtained every class.

43. A method according to claim 13, wherein the predicting step includes performing a class sort to the target image signal, thereby forming a class; and storing the optimum predictive value which has previously been obtained by learning every class in a memory means.

44. A method according to claim 43, wherein said optimum predictive value which is stored into said memory means is previously obtained by using a center of gravity method every class which is sorted on the basis of said target image signal.

45. A method according to claim 43, wherein when an activity of said target image signal is small, said image signal is excluded from learning targets and a learning is performed and said optimum predictive value is obtained every class.

46. An apparatus according to claim 15, wherein in said class sort, said motion evaluation value is directly sorted.

47. A method according to claim 23, wherein said prediction equation is a liner combination equation.

48. A method according to claim 23, wherein the storing step stores the predictive coefficients which have previously been obtained by learning in a memory means and wherein as for said predictive coefficients which are stored into said memory means, the predictive coefficients in which an activity of said motion evaluation value is small are excluded from learning targets and the learning is executed every class which is sorted on the basis of said motion evaluation value.

49. A method according to claim 23, wherein in said class sort, said motion evaluation value is directly sorted.

50. A method according to claim 24, wherein the storing step stores the optimum predictive values which have previously been obtained by learning in a memory means and wherein said optimum predictive values which are stored in said memory means are previously obtained by using a center of gravity method every class which is sorted on the basis of said motion evaluation value.

51. A method according to claim 24, wherein the storing step stores the optimum predictive values which have previously been obtained by learning in a memory means and wherein as for said optimum predictive values which are stored in said memory means, the optimum predictive values in which an activity of said motion evaluation value is small are excluded from learning targets and the learning is executed every class which is sorted on the basis of said motion evaluation value.

52. A method according to claim 24, wherein in said class sort, said motion evaluation value is directly sorted.

53. A motion vector detecting apparatus for detecting a motion vector at a below-pixel precision of an input image, comprising:

predicting means for predicting a pixel value at a position which is more detailed than a pixel position by using a class sort adaptive process to a target image signal; and motion vector detecting means for detecting the motion vector for the image signal including said predicted pixel value;

wherein said motion vector detecting means executes a motion vector detection by a phase correlation method.

54. A method for detecting a motion vector at a below-pixel precision of an input image, said method comprising the steps of:

predicting a pixel value at a position which is more detailed than a pixel position by using a class sort adaptive process to a target image signal; and detecting the motion vector for the image signal including said predicted pixel value;

wherein the detecting step executes a motion vector detection by a phase correlation method.

* * * * *